United States Patent [19]

Young et al.

[11] Patent Number: 4,719,594
[45] Date of Patent: Jan. 12, 1988

[54] GROOVED OPTICAL DATA STORAGE DEVICE INCLUDING A CHALCOGENIDE MEMORY LAYER

[75] Inventors: Rosa Young, Troy; Napoleon Formigoni, Birmingham, both of Mich.

[73] Assignee: Energy Conversion Devices, Inc., Troy, Mich.

[21] Appl. No.: 769,227

[22] Filed: Aug. 26, 1985

Related U.S. Application Data

[63] Continuation-in-part of Ser. No. 667,294, Nov. 1, 1984, abandoned.

[51] Int. Cl.$^4$ .................... G11C 13/00; G11B 3/70
[52] U.S. Cl. ..................... 365/113; 365/215; 346/137; 346/76 L; 369/277; 369/286; 430/945
[58] Field of Search .............. 365/113, 163, 106, 215; 346/76 L, 135.1, 137; 369/275, 283, 286, 277; 430/945; 357/2

[56] References Cited

U.S. PATENT DOCUMENTS

4,417,331 11/1983 Takaoka et al. .................... 369/284
4,449,138 5/1984 Ando .................................. 346/135.1
4,461,807 7/1984 Mori et al. ......................... 346/135.1
4,606,017 8/1986 Broer et al. ......................... 369/286

FOREIGN PATENT DOCUMENTS

0038746 2/1985 Japan .................................. 369/284

*Primary Examiner*—Stuart N. Hecker
*Assistant Examiner*—Glenn A. Gossage
*Attorney, Agent, or Firm*—Richard M. Goldman; Marvin S. Siskind; Judith M. Riley

[57] ABSTRACT

Disclosed is an optical data storage device having incorporated therein an optical data storage medium. The optical data storage device is switchable between at least two detectable states by the application of projected beam and energy thereto. The optical data storage device has a first substantially transparent substrate with a first polymeric adhesive layer thereon characterized by grooves in the form of lands and valleys, a first inorganic encapsulating layer, a layer of the state changeable chalcogenide memory material, a second inorganic encapsulating layer, an adhesive layer, and a second substantially transparent substrate adherant to the adhesive layer.

1 Claim, 9 Drawing Figures

GROOVED OPTICAL DATA STORAGE DEVICE INCLUDING A CHALCOGENIDE MEMORY LAYER

CROSS REFERENCE TO RELATED APPLICATION

This is a continuation-in-part of our commonly assigned, copending U.S. application Ser. No. 667,294 filed Nov. 1, 1984, now abandoned, for Method of Forming An Optical Data Storage Device.

ART TO WHICH INVENTION RELATES

The invention disclosed herein relates to optical data storage devices where data is stored in a material, e.g. a phase-changeable material, that is switchable between at least two detectable states by the application of projected beam energy thereto.

BACKGROUND OF THE INVENTION

Non-ablative, phase-changeable, optical data storage systems record information in a phase-changeable material that is switchable between at least two detectable states by the application of energy thereto, for example, the application of projected beam energy such as optical energy, particle beam energy, or the like.

The phase-changeable optical data storage material is present in an optical data storage device having a structure such that the optical data storage material is supported by a substrate and encapsulated in encapsulants. The encapsulants may include anti-ablation materials, thermal insulating materials and layers, anti-reflection layers between the projected beam source and the data storage medium, reflective layers between the optical data storage medium and the substrate, and the like. Various layers may perform more than one of these functions. For example, the anti-reflection layer may also be a thermal insulating layer. The thicknesses of the layers, including the layer of optical data storage material, are optimized to minimize the energy necessary for a phase change for a given material while retaining the high contrast ratio, high signal to noise ratio, and high stability of the phase-changeable data storage material.

The phase-changeable material is a material capable of being switched from one detectable state to another detectable state by the application of projected beam energy thereto. The phase-changeable material is such that the detectable states may differ in their morphology, relative degree of order, relative degree of disorder, and be detectable therebetween by the electrical conductivity, electrical resistivity, optical transmissivity, optical absorption, optical reflectivity or any combination thereof.

The optical data storage material is typically deposited as a disordered material, for example, by evaporative deposition, chemical vapor deposition, or plasma deposition. Plasma deposition includes sputtering, glow discharge, and plasma chemical deposition. The optical data storage material is usually a multielement chalcogenide alloy, which in most cases, will undergo a change in local order, e.g., a change in local bonding and/or phase separation, to a certain extent upon cycling between detectable states. This means that the erased state may, at least during initial cycles, exhibit variant properties. The resulting, as deposited, disordered material must be formed. That is, the memory material must be conditioned or otherwise prepared (a) to receive data if the data is going to be recorded in a disordered (binary "1") state, and (b) to be stable with respect to changes in local order, e.g., changes in local bonding and/or phase separation, after numerous, subsequent erase and write cycles. As used herein "forming" means converting all of the individual memory cells from the as deposited, quenched from vapor state to an ordered state corresponding to binary "0", which ordered state is stable against further, undesired changes in local order, such as undesired changes in local bonding and/or phase separation, during numerous subsequent erase and write cycles.

Formation requires the conversion of the data storage material from the as-deposited quenched from the vapor, disordered state corresponding to binary "1", to a more ordered state. Formation may be either (1) directly from the as deposited, quenched from the vapor state to the formed (binary "0") state, or (2) from the as deposited, quenched from the vapor state through intermediately ordered states, with subsequent conversion from the ordered state to subsequent, quenched from the liquid, disordered states, and then to the formed (binary "0") state (3) directly from the as deposited, vapor quenched, as deposited state to the formed, quenched from the liquid state. The quenched from the liquid, disordered state after formation is different from the as-deposited, quenched from the vapor, disordered state.

Formation of the deposited material whether by (a) conversion from the as deposited state directly to the formed (binary "0") state, or (b) conversion from the initial disordered state to a laser vitrified, relatively more ordered, i.e., darkened state, with subsequent conversion to and through further disordered states to the formed state having invariant localized bonding and/or phase separation properties, requires an input of certain specific amounts of energy per unit volume of the optical data storage material. This may be accomplished by a laser beam, e.g., a laser beam switchable between power densitities. The laser beam may be a focused laser beam, e.g., the same focused laser beam used in the optical data storage system for erasing (crystallizing) and writing (melting and vitrifying). The laser beam forms one track at a time by passing over the track many times to convert the material on the track from the as-deposited, disordered, material to the more ordered material. Formation, which may include melting and solidification when an intermediate disordered state is formed, requires the balancing of the laser power density, disk rotation speed, total exposure, and number of revolutions per track. If these variables are not properly balanced, the resulting material may not have the proper morphology to serve as the basis of formation. Improper formatione an result in undesired, variant phase separation, large grain size, and poor contrast characteristics. Formation is not only an energy intensive step in the manufacturing process, requiring precise control, but also because it is done one track at a time, a time consuming, low productivity step in the manufacturing process.

SUMMARY OF THE INVENTION

The problems inherent in formation of the optical data storage material are obviated by the method of the present invention.

As herein contemplated, substantially all of the as-deposited, disordered material in the data storage device may be converted to an ordered material by a single, incident, ordering pulse to the optical data storage material. The single pulse is energetic enough to order the material while avoiding melting thereof. The pulse is either collimated or non-collimated, and either monochromatic or non-monochromatic.

According to one exemplification, the formation pulse converts the as deposited material directly to the formed (binary "0") material, e.g., if the as deposited (quenched from the vapor) and the laser vitrified states have no differences in localized order or bonding. According to an alternative exemplification, the as deposited, vapor quenched material may be crystallized to a more ordered material, and is then vitrified (melted and solidified) to a disordered material, e.g., different from the as deposited state, and recrystallized to the formed state preferably by a single pulse to the entire device. The crystallizing pulse is energetic enough to crystallize the material without melting. The disordering energy pulse must be energetic enough to melt the ordered material and allow it to solidify as a disordered material. This step may be and preferably is repeated several times until stable "written" properties are obtained.

The ordering energy is applied to the optical data storage medium, e.g., substantially the entire surface of the medium, and only once per memory cell, as a single pulse. The pulse heats the material above its crystallization temperature, for a time duration that is longer than the time required for crystallization. For typical tollurium based alloys, the crystallization temperature is from 100° C. to 150° C. and the crystallization time is on the order of 0.1 to 10 microseconds. For these alloys, the crystallization pulse, is about 0.1 to 1 joule per square centimeter with a duration of about 0.1 to 100 microseconds from a non-monchromatic source as a tungsten or xenon flash tube, and from about 50 nanoseconds to about 10 microseconds from a monochromatic light source. This serves to convert the as-deposited, disordered material to an ordered material, changes the optical transmissivity from about 10 percent to less than 2 percent, and changes the reflectivity from less than 30 percent, e.g., from about 20 to 25 percent to more than thirty percent, e.g., to about 39 to 45 percent. In a preferred exemplification, the 1 percent transmissivity, 43 percent reflectivity state obtained thereby is the formed state.

In an alternative exemplification where the ordered state so-obtained is not sufficiently darkened, the first ordered state is then converted to a disordered state that is subsequently converted to a state capable of being detected as the binary "0". This conversion to a disordered state is done by the use of either a monochromatic light source or a non-monochromatic light source. When done with a monochromatic light source, such as a YAG laser, a ruby laser, or an excimer laser, the light soruce has an energy density of about 10 to 100 millijoules/cm$^2$, and a duration of 10 to 100 nanoseconds. This serves to convert the relatively ordered material to a disordered state with accompanying changes in optical transmissivity, e.g. from 2 percent to 7-8 percent, and in reflectivity, e.g., from at least 30%, and preferably from 35-40% to less than 30%, and preferably to 21-24% when measured with light having a wavelength of 830 nanometers. In order to bring the material to the formed state, a second, more energetic, ordering energy is applied, that changes the optical transmissivity to about 1%, and the reflectivity to 40-50%. Reflectivity is an interface property. However, when referred to herein, reflectivity refers to the reflectivity of the optical data storage medium—air interface, unless stated to the contrary.

According to the method of the invention, there is provided a data storage device, e.g., a disc adapted for use with a projected beam energy source, e.g., optical energy. The device has two substrates. The first substrate, or a coating or layer thereon is concentrically grooved. The grooves have a depth of about 900 Angstroms a width of about 1.5 to 2.5 microns, and a pitch of about 2.0 to about 3.2 microns, providing a land or mesa width of about 0.5 to about 0.7 microns. A first adhesive layer, e.g., photopolymer layer is deposited on the substrate. This layer may provide the grooving and provides adhesion of the substrate to the active materials.

The active materials are present as a multilayer, e.g. a trilayer, of a first encapsulant, the active, state changeable memory material, and a second encapsulant. The active multilayer conforms to the grooved substrate, with the first encapsulating layer being bonded to the adhesive layer, and conforming to the adhesive layer and to the grooved substrate. The state changeable memory material forms an interface with and conforms to the first encapsulating layer. The active, state change material has a second encapsulant on the opposite surface thereof. The second encapsulant forms an interface width and conforms the active, state changeable material.

A second adhesive layer, e.g., a second photopolymer layer, provides adhesion between the second encapsulant layer and the second substrate.

According to the invention herein contemplated one of the set of lands or the set of valleys is crystalline, and the other is amorphous after formation.

THE FIGURES

The invention may be particularly understood by reference to the Figures appended hereto.

DETAILED DESCRIPTION OF THE INVENTION

According to the invention described herein, a phase-changeable memory material, that is a phase-changeable optical data storage material, is formed by simultaneously switching substantially all of the phase changeable optical data storage material from an initial, as-deposited, disordered state to a more ordered state. A single ordering pulse of proper energy density, power density, and duration substantially completely orders the portion of the memory material on which it is incident, thereby obviating the need for a chain of repetitive ordering pulses, e.g., on a single track. According to the invention described herein, multiple track-by-track formation is obviated and substantially the entire exposed surface of the optical data storage device is converted from the as deposited state to a more ordered state. That is, a plurality of memory cells arrayed in proximity to each other, and even all of the individual memory cells in a device are ordered by a single ordering pulse. Thereafter, the material may be switched to a relatively less ordered state, for example, a second disordered state different from the as-deposited disordered state, and then to an ordered state.

Figure 1A:
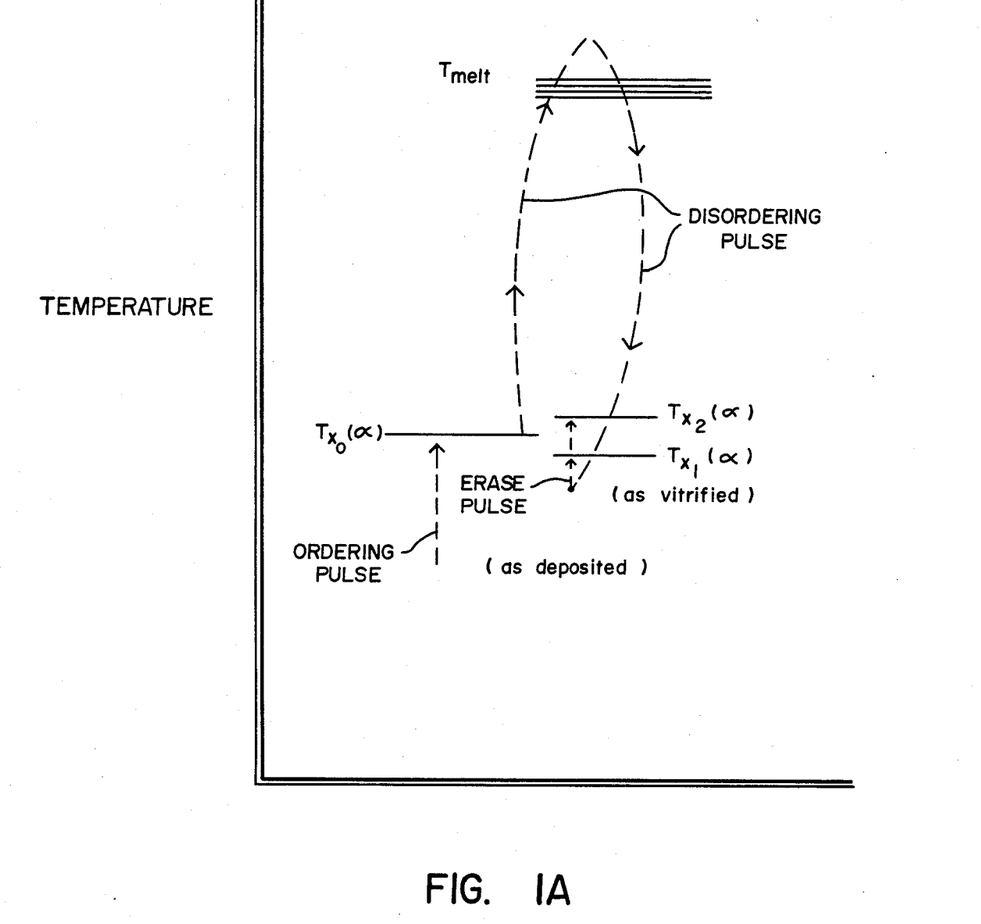
FIG. 1A is a schematic representation of a postulated temperature-memory state diagram of an individual memory cell requiring predarkening as part of the formation process.
Figure 1B:
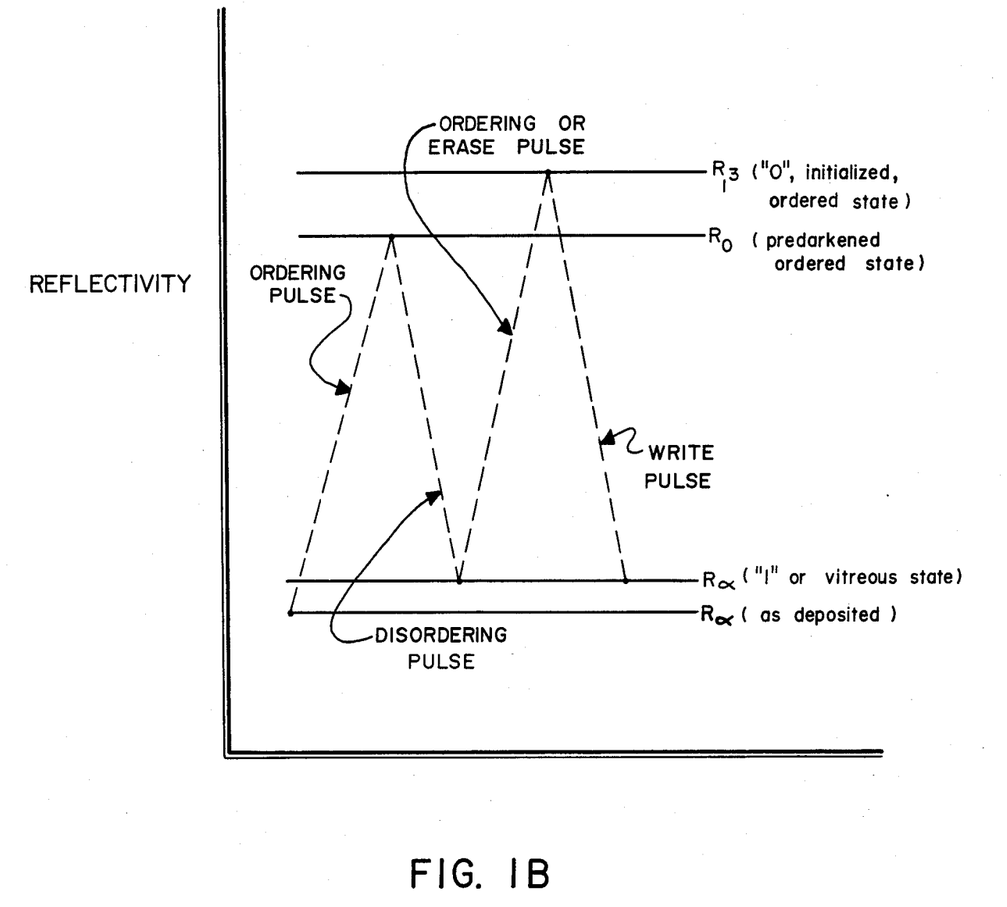
FIG. 1B is a schematic representation of a postulated temperature-reflectivity diagram of an individual memory cell requiring predarkening as part of the formation process.
Figure 2A:
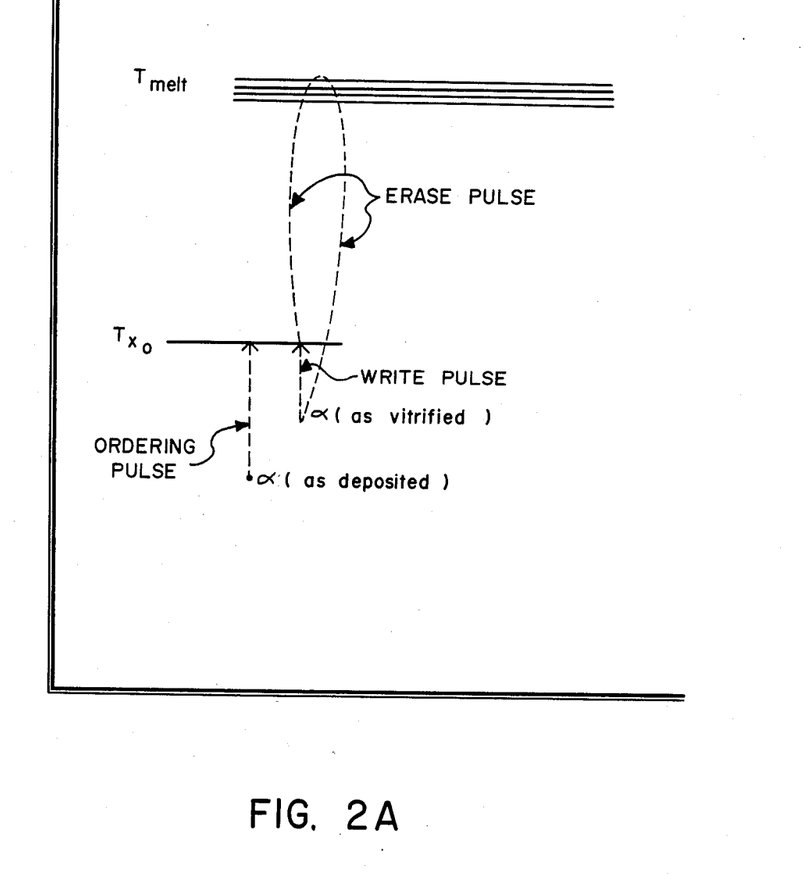
FIG. 2A is a schematic representation of a postulated temperature-memory state diagram of an individual memory cell formable from the as deposited state.
Figure 2B:
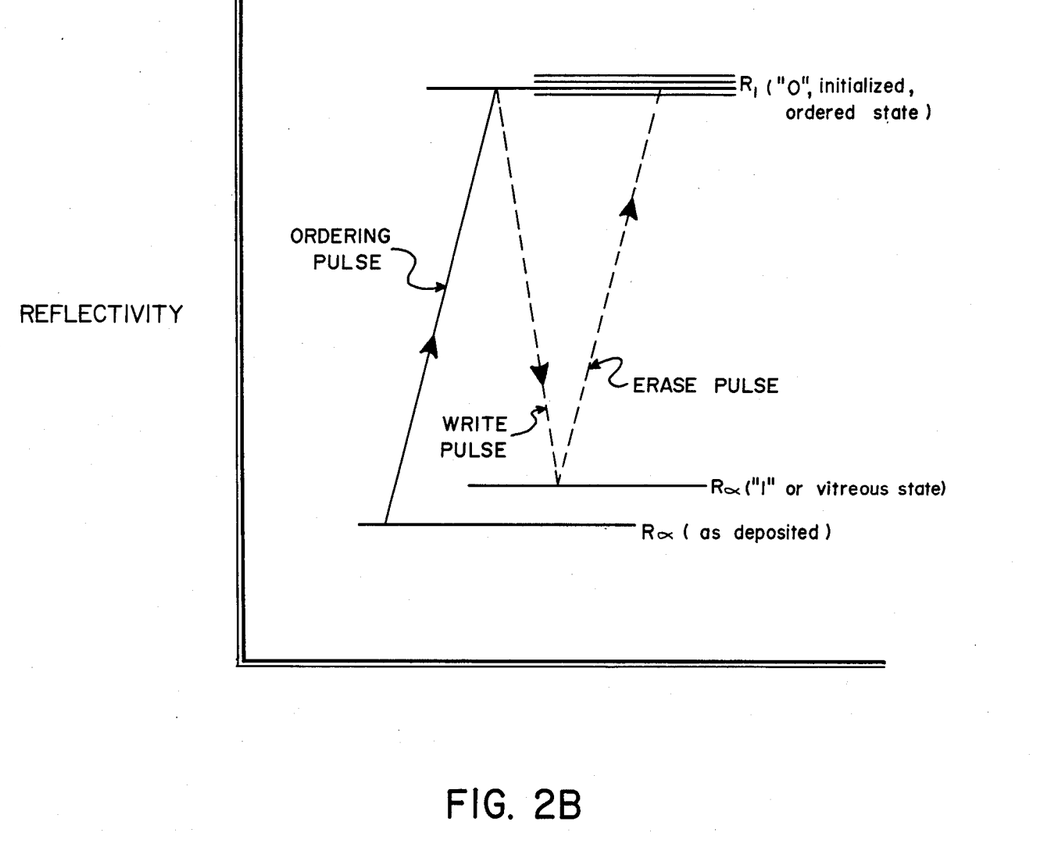
FIG. 2B is a schematic representation of a postulated temperature-reflectivity diagram of an individual memory cell initializable from the as deposited state.

The order-disorder versus temperature history relationships and reflectivity versus temperature history relationships can be understood by reference to FIGS. 1A, 1B, 2A and 2B respectively. Shown in FIGS. 1A and 2A are schematic representations of a postulated order-disorder versus temperature history model for relevant volumes of memory material, referred to herein as an individual memory cell. Shown in FIGS. 1B and 2B are schematic representations of relative reflectivity versus temperature history observations.

The as-deposited state is a disordered state, represented in FIG. 1A and 2A by "ALPHA (as deposited)", and in FIGS. 1B and 2B as "$R_{ALPHA}$ (as deposited)" and having a low reflectivity, e.g., less than 30 percent, and a high transmissivity, e.g., above about 5 percent. This disordered material having a crystallization temperature represented by "$Tx_o$" is converted to an ordered material, and having a higher reflectivity, e.g. above about 30 percent and a lower transmissivity, e.g., less than about 2 percent, by a pulse of energy represented by the dashed line "Ordering Pulse" in FIGS. 1A through 2B. The ordering pulse is energetic enough, that is, it has a high enough energy density and power density, to raise the temperature of the memory material within the memory cell above the crystallization temperature, $Tx_o$, for a time sufficient to allow crystallization with minimum phase separation, but not energetic enough, that is, not having a high enough energy density or power density, to melt the material. By an ordering pulse is meant a pulse energetic enough to raise the temperature of the memory material within a relevant volume, e.g., an individual memory cell, above its crystallization temperature, Tx, but not energetic enough to raise it above its melting temperature, $T_{melt}$.

Depending upon the material, formation may be by a three pulse "ordering pulse"—"disordering pulse"—"ordering pulse" sequence shown in FIGS. 1A and 1B, which may be repeated, or by a single pulse, shown in FIGS. 2A and 2B.

According to the exemplification shown in FIGS. 1A and 1B, the disordered material, having a reflectivity "$R_{ALPHA}$ (as deposited)" is crystallized to an ordered state having a crystallization temperature "$Tx_o$" and a reflectivity "$R_o$ (predarkened ordered state)". Next, the ordered memory material having reflectivity "$R_o$ (predarkened ordered state)" is then converted to a disordered state having a reflectivity "$R_{ALPHA}$ ("1" or vitreous state)". Conversion is accomplished by subjecting the ordered material to one or more disordering pulses, represented in FIGS. 1A and 1B as "Disordering Pulse." The disordering pulse or pulses are energetic enough, i.e., has a high enough energy density and power density, to raise the temperature of the memory cell or cells above the melting temperature thereof. By a "disordering pulse" is meant a pulse that melts ordered material under conditions where the molten material solidifies to a less ordered material. The molten memory material quickly cools and solidifies, i.e., vitrifies, forming a disordered material having a reflectivity $R_{ALPHA}$. This resulting disordered state, corresponding to binary "1", is represented by "ALPHA (as vitrified)" in FIG. 1A and "$R_{ALPHA}$ ("1" or vitreous state)" in FIG. 1B.

The disordered material may be a material having a crystallization temperature, $Tx_1$, below that of the as-deposited, disordered material, $Tx_o$. Alternatively, the disordered material may be a material having a crystallization temperature, $Tx_2$, above that of the as-deposited material, $Tx_o$. Or, the disordered material may contain inclusions, regions, and/or zones of low crystallization temperature, $Tx_1$, material, and of high crystallization temperature $Tx_2$, material.

The disordered material corresponds to binary "1" and has a reflectivity $R_{ALPHA}$. It is "erased", i.e., converted to an ordered state corresponding to binary "0", with reflectivity $R_1$ by an erasing pulse. The erasing pulse, represented by "Erase Pulse" in FIGS. 1A and 1B, is an ordering pulse having sufficient energy to convert at least some of the disordered memory material in a relevant volume to ordered material. As used herein, an "erase" pulse is an ordering pulse for converting disordered material to ordered material while avoiding formation of molten material.

The energy pulse for erasing, i.e., for converting disordered material to ordered material, should be energetic enough, i.e., should have a high enough energy density and a high enough power density, to crystallize the disordered material, but should have a low enough energy, i.e., a low enough energy density and/or a low enough power density, to avoid melting the material, to avoid the formation of crystallites having a size above about 150 angstroms, and to minimize or even avoid undesirable phase separation. As a consequence, because of the presence of some of the high crystallization temperature material, i.e., disordered material having a crystallization temperature represented by $Tx_2$, the "erase" pulse may need to be higher than the "ordering" pulse. For the same reason, because of the presence of some high melting temperature phases, including high melting temperature inclusions, the "writing pulse" may have to be more energetic than the "disordering pulse".

In alternative and preferred exemplification, shown in FIGS. 2A and 2B, the as deposited, disorder material, having a crystallization temperature represent by $Tx_o$ in FIG. 2A and an as deposited reflectivity represented by "$R_{ALPHA}$ (as deposited)" in FIG. 2B, may be directly formed to an ordered material, corresponding to a binary "0" state by application of an "ordering pulse".

Figure 3:
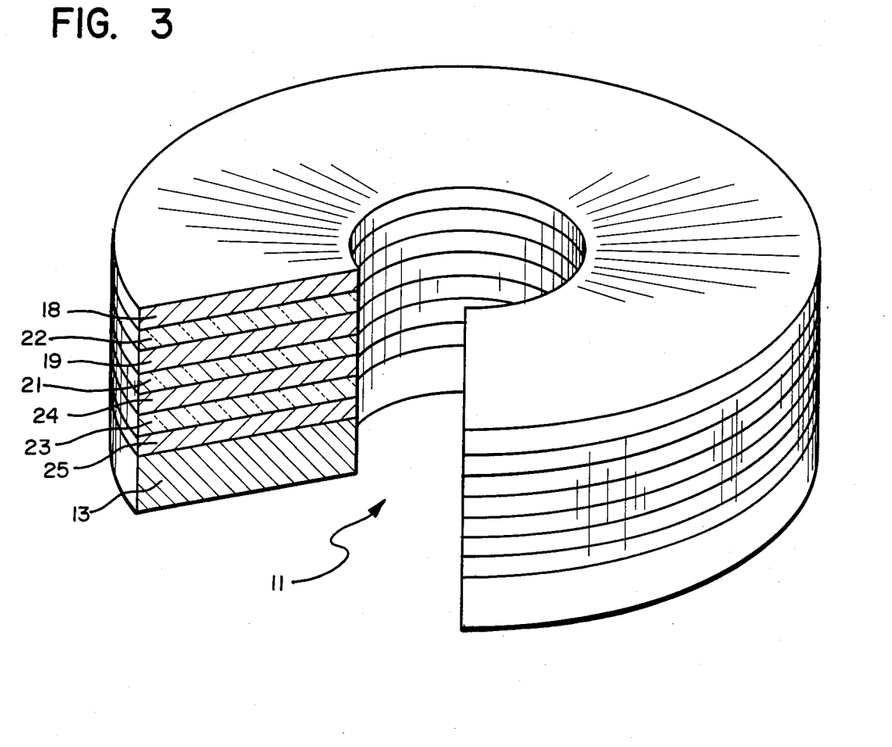
FIG. 3 is an isometric partial cut-away view, not to scale, with exaggerated latitudinal dimensions and vertical scale of an optical data storage device.
Figure 4:
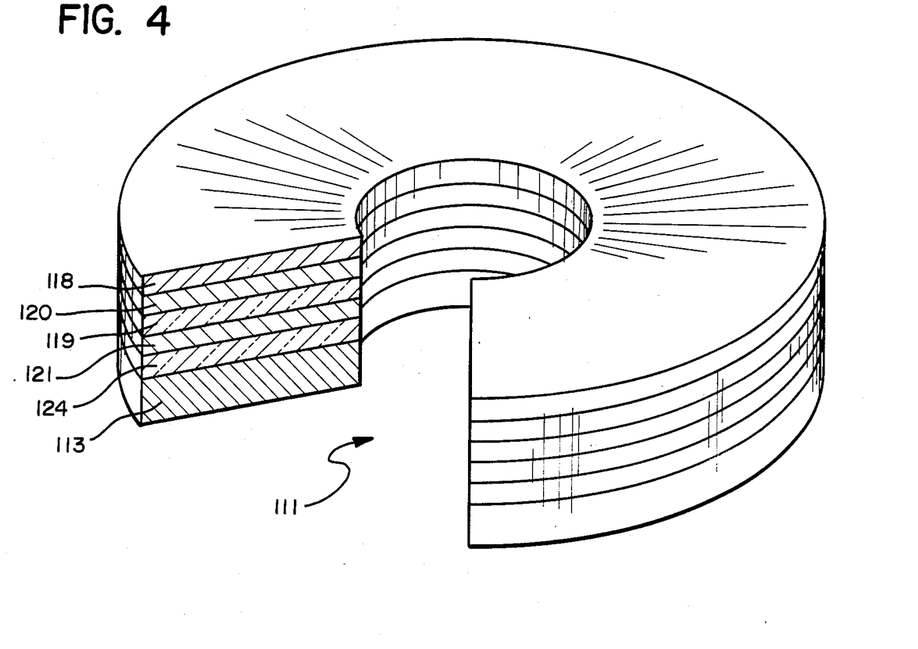
FIG. 4 is a partial cut-away isometric view, also not to scale with exaggerated latitudinal dimension and vertical scale, of a simplified optical data storage device.

The optical data storage device herein contemplated is exemplified by optical disk means shown in FIGS. 3 and 4. The device 11 shown in FIG. 3 has a rigid substrate 13 supporting at least an encapsulated phase-changeable optical data storage material 21. Data is stored in individual memory cells or bits in the data storage material 21. The individual memory cells are arrayed along parallel tracks, with the cells about 0.7 microns to 4 microns apart measured center to center along a track, and the tracks being about 1 micron to 4 microns apart. An individual memory cell typically has a surface area of 0.5 micron$^2$ to 4 micron$^2$, and utilizes about 0.7 to 12 micron$^2$ of surface area.

The phase-changeable optical data storage material 21 is operatively encapsulated between an anti-ablation coating 19 and a reflective coating 25. The anit-ablation coating 19 is between the projected energy beam and the phase-change optical data storage material 21. The reflective coating 23 is on the opposite side of the phase-changeable optical data storage material 21, between the phase-changeable optical data storage material 21 and the substrate 13. The tri-layer of the anti-ablation coating 19, the phase-changeable optical data storage media memory 21 and the reflective coating 23 may be further encapsulated between an external transparent protective layer 18 and the substrate 13.

The anti-ablation coating 19 enhances the conversion of projected beam energy, for example, optical energy to thermal energy, inhibits the tendency for pits or ablations to form in phase-changeable optical data storage material 21, and is substantially transparent to the projected beam erasing, reading and writing pulses. Preferably the anti-ablation coating 19 is formed of a dielectric material that is a thermal insulator. Exemplary materials are silicon dioxide and germanium dioxide. Where the particle beam is a laser beam, the thickness of the anti-ablation coating is on the order of the laser wavelength or an even harmonic thereof, i.e., the wavelength divided by 2n where n is from 1 to 10. Generally the thickness of the anti-ablation coating is from about 0.1 to 0.5 microns but is optimized with the thickness of the phase-changeable memory material layer 21 and the reflective layer or coating 23 to optimize the energy relationships within the optical data storage device 11.

Optinally, there may be a transparent dielectric film 22 above the anti-ablation coating 19, having a thickness of from about 500 angstroms to about 20 microns and serving to electrically insulate static charge. The dielectric film 22 is positioned between the transparent encapsulating film 18 and anti-ablation coating 19.

The reflective coating 23, e.g., a dielectric coating, as an aluminum oxide coating, or a germanium oxide coating, has a thickness of about 100 angstroms to about 2 microns. The reflective coating 23 enhances the optical efficiency of the phase-changeable optical data storage material 21.

Additionally, there may be a thermal barrier 24 on the opposite side of the optical data storage material 21 between the optical data storage material 21 and the reflector 23 to enhance the conversion of the particle beam energy to thermal energy. When present, the thermal barrier 24 is from about 0.1 micron to about 20 microns thick and is formed of silicon dioxide or germanium oxide.

The encapsulant transparent film 18 provides protection from the environment, especially from water and water vapor, and is typically a transparent metal oxide or an organic polymer, for example, polymethymethacrylate or the like. Additionally, a subbing layer formed, for example, of polymethylmethacrylate, may be provided between the substrate and the thermal barrier.

The anti-ablation coating 19, the optical data storage material 21, the transparent dielectric 22 (when present), reflective layer 23 and the thermal barrier 24 (when present) are optically coupled and optimized. That is, the thicknesses and optical properties of the layers are optimized so as to optimize anti-reflective properties, favor high reflection in the read mode, and high absorption in the "erase" and "write" modes. Where the optical coupling or optimization is thrusly optimized, the total energy applied is reduced.

In the alternative exemplification shown in FIG. 4, there is provided an optical data storage device 111 having a substrate 113 with a reflective, thermally insulating film, coating or layer 124 of an oxide, for example, germanium oxide, tellurium oxide or the like. The insulating, reflective layer 124 is from about 0.1 to about 0.5 micron thick. Above the reflective, insulating layer 124 is a phase-changeable optical data storage material 121 having a thickness of from about 500 to about 2000 angstroms thick. Above the layer 121 of optical data storage material is a layer 119 of an anti-ablation, anti-reflective material 119. The anti-ablation, anti-reflective coating 119 is also formed of a transparent dielectric, as a metal oxide or other metal compound such as germanium oxide, and has a thickness of about 0.1 to about 0.3 micron. Bonded thereto by an adhesive resin film 120 is an encapsulating, encapsulating polymeric layer, 118 e.g. of polymethylmethacrylate, about 0.25 to about 2 millimeters thick.

The layer of optical data storage material 21, 121 is from about 50 angstroms to about 2 microns thick and especially from about 500 angstroms to about 2000 angstroms thick and in a particularly preferred exemplification from about 700 to about 1500 angstroms thick.

Figure 5:
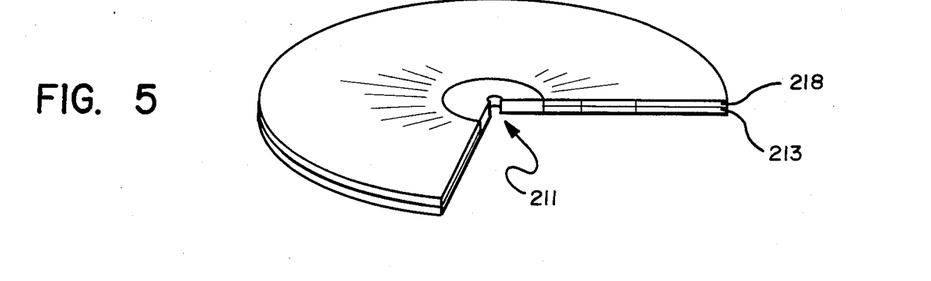
FIG. 5 is an isometric partial cut-away view, not to scale, with exaggerated latitudinal dimension and vertical scale of an alternative exemplification of the optical data storage device.

In a reversible system, that is a system with "read" and "write" and "erase" capability, the phase-changeable material 21, 121, 221 is reversible with the absence of topographic change on phase change and has a signal to noise ratio above about 40 decibels and preferably above about 50 or more decibels.

The phase-changeable material 21, 121, 221 is phase-changeable between a plurality of detectable states, that is between two or more detectable states, exemplified by a disordered or amorphous state and an ordered state, or between relative degrees of localized order which are detectable.

The stable detectable states of the phase-changeable optical data storage material, 21, 121, 221 may be optically detectable as by reflectivity, refractivity, absorbency, or transmissivity. Alternatively, they may be electrically detectable as by resistance or capacitance.

Figure 5A:
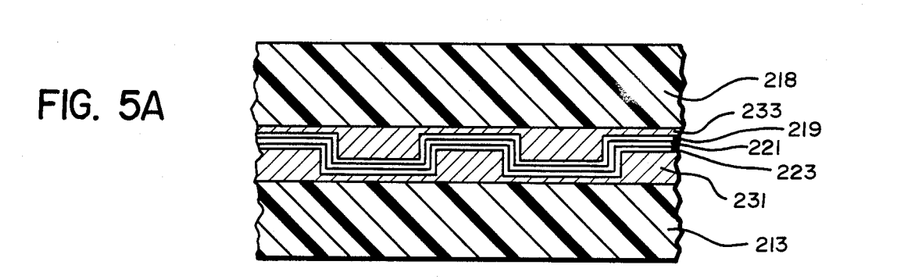
FIG. 5A is a partial cut-away view of a section of the optical data storage device shown in FIG. 5.

According to a particularly preferred exemplification of the invention, there is provided a data storage device 211, for example an optical data storage disc, as shown in FIG. 5 and 5A. The disc is adapted for use with a projected beam energy source, e.g., a laser.

The device 211 has two substrates 213, 218. The substrates 213, 218, are formed of a transparent material, e.g., a polymeric material such as polymethyl methacrylate. Atop the substrate 213 is a layer 231, e.g. a photoinitiated, polymerized acrylic layer. Polymerized, molded or cast into the photopolymer layer 231 are concentric grooves. The grooves have a depth represented by the function λ/8, where λ is the wavelength of the incident energy, e.g., about 900 Angstroms, a width in the valleys of from about 1.5 to about 2.5 microns, and preferably about 2.0 microns, a width on the lands of from about 0.5 to about 0.7 microns, and preferably about 0.5 microns and a pitch of from about 2.0 to about 3.2 microns and preferably about 2.5 microns.

The active materials, e.g., a multilayer of inorganic encapsulant 223, the active state change material 221, and a second layer of inorganic encapsulant 219, are present between the two substrates 213, 218. Inorganic encapsulant layer 219 adheres to substrate 218 with adhesive layer 233. The adhesive layer 233 and the layers 219, 221, 223 conform to the grooves in the grooved photopolymer layer 231.

The layers 231, 233 are formed of photo-initiated polymers, e.g., photopolymers. Typical photopolymers include acrylates and epoxides. The grooved layer 231 adheres to the first substrate 213. The adhesive layer 233 is adherent to the second substrate 218. The adhesive layer 233 is about 1000 Angstroms to about 100 microns thick, and the grooved layer 231 is about 500 to about 2500 Angstroms thick.

The active portion of the device 211 includes the first encapsulant layer 223, the layer of active state changeable memory material 221, and the second encapsulant layer 219. The three layers 219, 221, 223, conform to the grooved, first substrate 213. The encapsulant layers 219, 223 are from about 1500 to about 2500 Angstroms thick, the layer of active, state change material 221 is from about 500 to about 2000 Angstroms thick. The encapsulant layers 219, 223 may be single layers or multiple layers. The encapsulant is typically a dielectric, exemplified by germanium oxide. The active state change material is a chalcogenide.

According to the invention herein contemplated, one of the set of lands or of valleys is in an ordered state, e.g., a crystalline state. The set of lands or of valleys is converted to the relatively ordered state by the herein contemplated process and is generally not substantially vitrified by subsequent order-disorder or erase-write cycles.

The materials useful for providing these phase-changeable optical data storage materials 21, 121, 221 are materials where a phase-change with detectable properties occur. The states corresponding to the detectable properties are stable at the temperatures encountered in storage and operation. Normally, the materials are chalcogenides, e.g., tellurium based alloys, and they may be present as metals, as oxides, including nonstoichiometric oxides and other compounds, compositions and alloys thereof. Most commonly, the chalcogenide consists of tellurium alloyed with other components such as oxygen, sulfur, selenium, elements of Group IIIB, metals and semi-metals of Group IVB, semi-metals of Group VB, low melting point metals, and the like.

The chalcogenides, tellurium, tellurium-selenium alloys, and the like, and combinations thereof can have Group IIIB elements present therewith. Typical Group IIIB additive components and additives include boron, aluminum, gallium and indium. The chalcogenides, tellurium, tellurium-selenium alloys, and combinations thereof, may be combined with the metals and semi-metals of Group IVB including carbon, silicon, germanium, tin, lead and combinations thereof. Useful Group VB additive components include nitrogen, phospherous, arsenic, antimony and bismuth. Combinations of Group IVB adducts and other additive components may be present as a chalcogenide with (1) silicon, germanium, tin, lead or combinations thereof and (2) one or more additive components chosen from the Group consisting of (a) Group IIIB components, (b) Group VB components and (c) combinations thereof.

Typical combinations of Group IIIB and Group VB additive components include gallium arsenide and indium antimonide. Other combinations include (1) tellurium-germanium, (2) tellurium-germanium with gallium arsenide, (3) tellurium-germanium with gallium arsenide and iron, (4) tellurium-antimony, and (5) tellurium-lead. The above compounds, compositions, and alloys may also include oxygen, sulfur, or oxygen and sulfur, and may be present in the form of oxides, suboxides, sulfides, subsulfides, oxysulfides and sub-oxysulfides, as well as other nonstoichiometric compounds.

The chalcogenides or the oxides or sulfides thereof may be present with the transition metal additives, either as the metal or the oxide, or the sulfide, for example, vanadium, chromium, manganese, iron, cobalt, tungsten, titanium and the like.

The layer of optical data storage material 21, 121, 221 may be deposited by various techniques that result in the formation of a relatively disordered material. These include evaporation and various plasma processes. Exemplary plasma processes include sputtering where the deposit is introduced as a solid and deposited from an alloy target, cosputtered from multiple targets and/or reactively sputtered or cosputtered with a gas. Alternatively, the plasma process may be glow discharge process as is well known in the art and described in U.S. Pat. No. 4,226,898 to Stanford R. Ovshinsky and Arun Madan for Amorphous Semiconductor Equivalent To Crystalline Semiconductors, and U.S. Pat. No. 4,217,374 to Stanford R. Ovshinsky and Arun Madan For Amorphous Semiconductor Equivalent To Crystalline Semiconductor. The plasma process may be a d.c. process, a biased d.c. process, a radio frequency biased process, or a microwave process.

The above processes result in an as-deposited layer 21, 121, 221 that is disordered. That is, the material in the layer is characterized by the substantial absence of long range order and the presence of long range disorder, although short range, nearest neighbor atomic order may be present within the deposit.

The "as-deposited" morphology of the optical storage data material 21, 121, 221 differs from the morphology of the material obtained by converting a crystalline or ordered material to a disordered state by the application of energy thereto. That is, for data entry purposes, the disordered state corresponding to the binary number 1 (where the more ordered state corresponds to the binary number 0) may be different from the as-deposited disordered state. It is therefore necessary to utilize the method described herein to convert the as-deposited material to a more ordered material. The conversion of the as-deposited material is carried out during the manufacturing process by the application of energy thereto under conditions that do not result in ablation or change to the topography. This may be carried out after the encapsulation of material, for example, after deposition or formation of the anti-reflective, thermally insulating, dielectric, and atmospheric sealing encapsulant layers. Alternatively, formation may be carried out at an earlier stage in the manufacturing process, for example, in situ, in the deposition chamber immediately after deposition of the optical data storage material layer 21, 121, 221 and before any subsequent layer thereon.

According to the invention herein contemplated, the optical data storage device having incorporated therein an optical data storage medium 21, 121, 221 switchable between at least two detectable states, as described hereinabove, by the application of projected beam energy thereto, is present in the device 11, 111, 211 in an as-deposited, first, disordered state prior to formation. Formation, as herein contemplated, comprises the step of simultaneously applying a single, ordering energy pulse to many memory cells, and preferably to the entire surface of the data storage material 21, 121, 221, whereby to convert the optical data storage medium 21, 121, 221 from the as-deposited disordered state to a more ordered state. Thereafter, in one exemplification, a disordering energy pulse may be applied to the optical data storage medium 21, 121, 221 which converts the optical data storage medium from an intermediate ordered state to a second disordered state, e.g., as disordered state different from the as-deposited disordered state.

Figure 6:
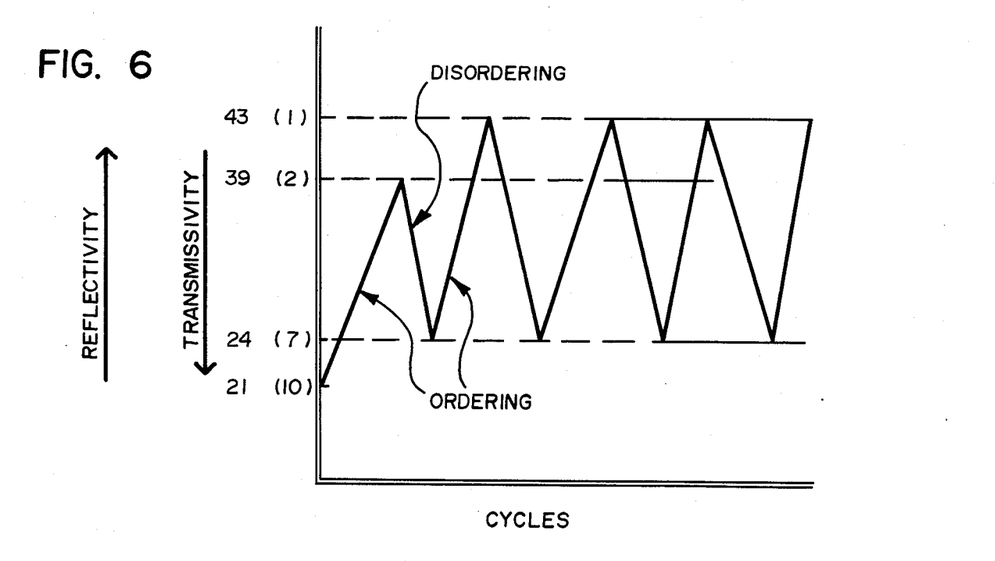
FIG. 6 is a graph of reflectivity versus number of cycles for an optical data storage system where the forming or ordering pulse is applied by a xenon flash lamp source and the disordering pulse is applied by a YAG laser.

This disordering pulse is followed by a second ordering energy pulse to convert the second disordered state to an ordered state having reflectivity "$R_1$ ("o", formed, ordered state)" as shown in FIG. 1B. The ordering energy pulses have an energy from about 0.1 to about 1 joule per square centimeter. The ordering energy pulses are applied to the optical data storage medium for an interval of from about 0.1 to 100 microseconds. Shorter durations of pulse do not result in substantially complete or satisfactory conversion to an ordered state, while longer duration pulses may result in substantial phase separation during crystallization. The ordering pulses are either monochromatic or non-monochromatic energy pulses. When they are non-monochromatic, they are applied from a non-monochromatic optical energy source, for example, a xenon or tungsten flash tube. When they are monochromatic, they are applied from a laser, as a ruby, alexandrite, YAG, or excimer laser. FIG. 6 is a graph of reflectivity versus number of cycles for an optical data storage device where the forming pulse, i.e., the ordering pulse is applied by a xenon flash lamp force, and the disordering pulse is applied by a YAG laser.

In an alternative exemplification, the relatively ordered optical data storage material 21, 121, 221 formed by the ordering of the as-deposited optical data storage material, is the formed state.

According to a particularly preferred exemplification of the invention, an optical data storage device is prepared on a grooved, blank substrate by the reactive sputtering of germanium in the presence of oxygen to form a germanium oxide film of about 700 to 1500 angstroms thick atop a thin film of polymethol methacrylate. Atop this film, there is formed a tellurium-tin-germanium oxygen film of from about 700 to about 1500 angstroms thick by the reactive cosputtering of germanium, tellurium and tin in the presence of an oxygen atmosphere. Atop the 700 to 1500 angstrom thick film of the phase-changeable material is applied a film of a germanium oxide film of about 1500 to about 3000 angstroms thick by reactive sputtering. Atop this film, an adhesive layer of about 0.05 to about 0.2 millimeters thick is applied and a polymethylmethacrylate plate of about 0.5 to about 2 millimeters thick is applied as an encapsulant.

The layer of tellurium-germanium-tin oxide, as sputtered, is in a disordered state having a reflectivity of 21% and an optical transmissivity of 10 percent. This layer is converted to a relatively more ordered state by the application of the projected beam energy by a xenon discharge lamp having an energy of about 0.5 joule per square centimeter, and a flash duration of about 50 microseconds. The resulting ordered state, characterized as "predarkened", has a reflectivity of 39% and an optical transmissivity of 2%.

The resulting ordered layer of optical data storage medium is then converted to a second, disordered state different from the deposited disordered state by the application of energy thereto from a YAG laser having an energy density of about 20 to about 50 millijoules per square centimeter, and a flash duration of about 15 nanoseconds. The resulting disordered material has a reflectivity of 24% and an optical transmissivity of 7%.

Thereafter, the disordered material is crystallized to a "formed" state, i.e., an "erased" state, by the application of a 0.6 joules per square centimeter xenon flash lamp having a duration of 50 microseconds. The resulting "initial" state has a reflectivity of 43% and an optical transmissivity of 1%. This is shown in FIG. 6.

While the invention has been described with respect to binary data, it is to be understood that the method of the invention can also be used with other forms of data, such as frequency modulated signals and gray scale signals.

While the invention has been described with respect to certain preferred exemplifications and embodiments thereof, it is not intended to limit the scope of the invention thereby but solely by the claims appended hereto.

We claim:

1. An optical data storage device comprising:
   (a) a first, substantially transparent, substrate;
   (b) a first polymeric, adhesive layer, having lands and valleys, the grooves having of about 900 Angstroms, the valleys of the grooves having a width of from about 1.5 to about 2.5 microns, the lands of the grooves have a width of from about 0.5 to about 0.7 microns, and the grooves being on a pitch of from about 2.0 to about 3.2 microns, the lands of the grooves having a thickness above the valleys of the grooves of from about 1500 to about 2500 Angstroms, comprising a polymeric material chosen from the group consisting of polyacrylates and polyepoxides, adherent to the first substrate;
   (c) a first inorganic encapsulating layer, having a thickness of from about 1500 to about 2500 Angstroms, comprising a dielectric oxide of germanium, bonded to the concentrically grooved, polymeric layer and conforming thereto;
   (d) a layer of state changeable chalcogenide memory material, having a thickness of from about 500 to about 2000 Angstroms, forming an interface with and conforming to the first inorganic encapsulating layer whereby the layer of state changeable memory material has defined therein by the concentrically grooved, polymeric layer a set of concentric lands and a set of concentric valleys, said set of valleys and said set of lands being substantially amorphous after deposition and prior to formation, said set of valleys being substantially crystalline after formation;
   (e) a second inorganic encapsulating layer, having a thickness of from about 1500 to about 2500 Angstroms, comprising a dielectric oxide of germanium, deposited atop, conforming to and forming an interface with the layer of state changeable memory material;

(f) an adhesive layer, having a thickness of from about 1000 Angstroms to about 100 microns, comprising a polymeric material chosen from the group consisting of polyacrylates and polyepoxides, forming an interface with and conforming to the second inorganic encapsulating layer; and (g) a second substantially transparent substrate, adherent to the adhesive layer.

* * * * *